UNITED STATES PATENT OFFICE.

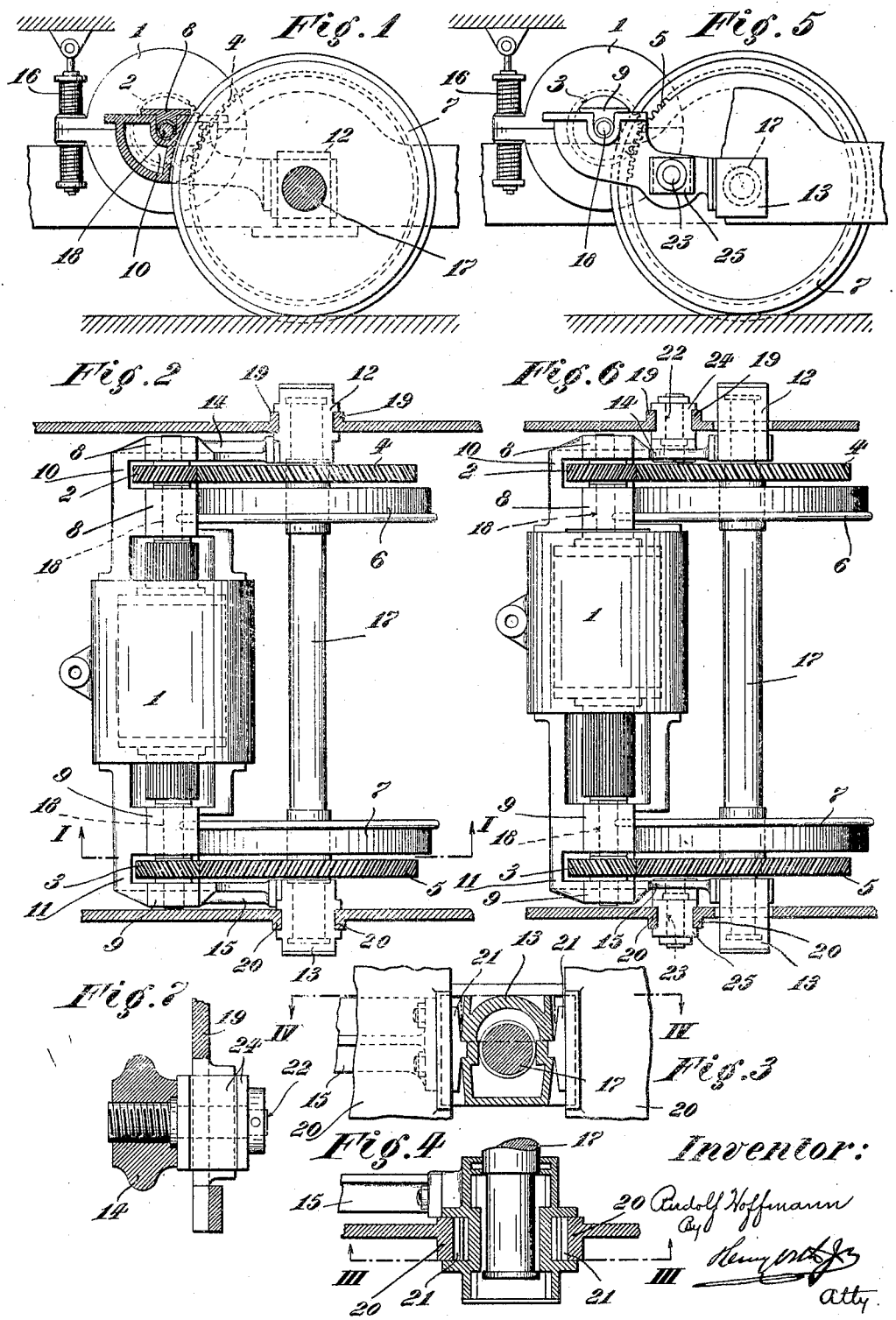
R. HOFFMANN.
ARRANGEMENT OF WHEEL GEARINGS FOR ELECTRICALLY DRIVEN VEHICLES.
APPLICATION FILED FEB. 21, 1919.
1,317,499.
Patented Sept. 30, 1919.

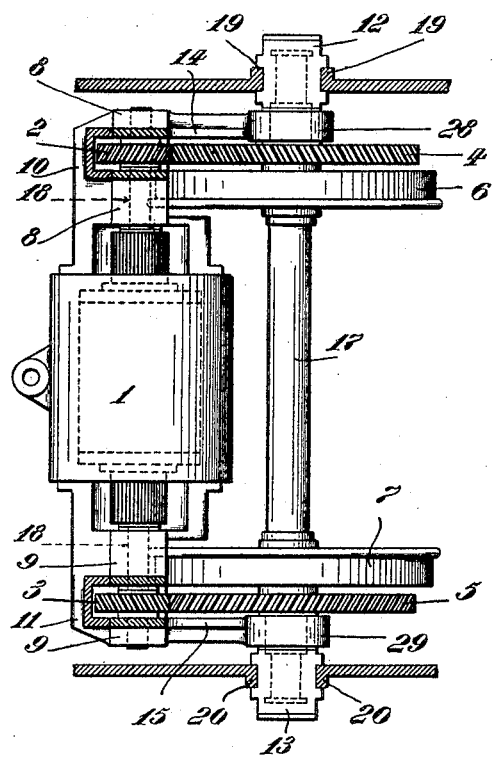
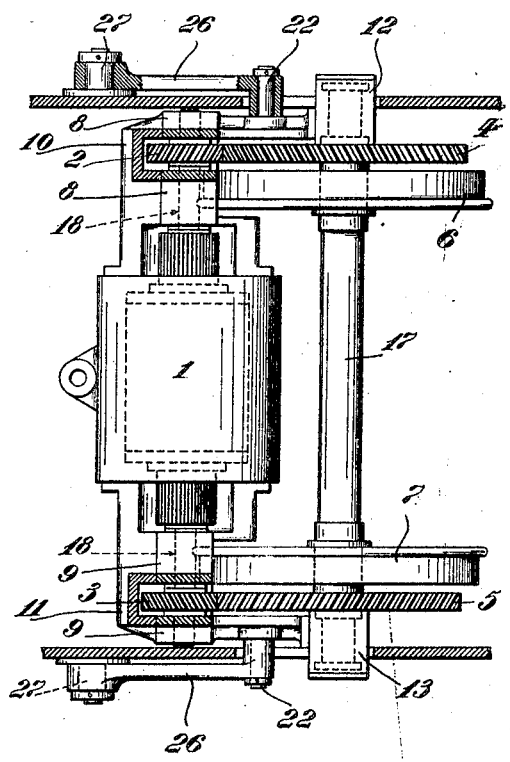

RUDOLF HOFFMANN, OF ROMANSHORN, SWITZERLAND.

ARRANGEMENT OF WHEEL-GEARINGS FOR ELECTRICALLY-DRIVEN VEHICLES.

1,317,499.   Specification of Letters Patent.   Patented Sept. 30, 1919.

Application filed February 21, 1919. Serial No. 278,456.

*To all whom it may concern:*

Be it known that I, RUDOLF HOFFMANN, a citizen of the Republic of Switzerland, residing at Romanshorn, Neustrasse 953, Switzerland, have invented certain new and useful Improvements in Arrangements of Wheel-Gearings for Electrically-Driven Vehicles; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in the arrangement of the tooth-wheel gearings for the motors of electrically driven vehicles which have an electric motor for each driving axle and in which the axle of each motor is kept in a true parallel position relatively to the appertaining driving axle.

The characteristic feature of the arrangement according to this invention consists in that two pairs of toothed wheels, which are provided in connection with each driving axle for the purpose of transmitting to the latter the tractive power generated by the appertaining motor, are placed on the outside of the two driving wheels that are mounted on the same driving axle in order that sufficient space may be obtained between the driving wheels for the placing of a motor of sufficient power to allow to make full use of all the adhesive weight that can be got on to the driving axle of a heavy locomotive or full loaded car.

In the few cases known heretofore where a double sided drive is provided, the gear wheels were located either on the inside of the driving wheels, thus leaving little room for the motor; when arranged outside, they were attached to the main-vehicle-frame, their axes being thereby (on account of the working of the bearing springs) not always kept parallel to the appertaining axles and being not always at the same height with it, so that they had to be connected to them and have to drive them by means of intermediate universal joints and links and springs heavily loaded and constituting a great encumbrance and giving rise to much additional wear and tear.

As pointed out above, the known arrangements of toothed wheel gearings arranged between the driving wheels of the vehicle have the drawback, that the motors can not be made, for want of space and in spite of the high number of revolutions, powerful enough to suit the adhesive weight of mainline engines.

This is also the case when the motors are placed directly around the driving axle and when no gearings are provided, for instance when the motors are mounted on a hollow shaft surrounding the driving axle or when otherwise fixed, as the dimensions of the motor must then be in this case larger on account of the low number of revolutions.

The method of transmitting the power from the motor to the wheels by means of connecting rods as used in steam locomotives, is also not satisfactory from the mechanical point of view when applied to the electrically driven locomotives.

All said gear arrangements hitherto known therefore do not give the same advantages and do not interfere with the arrangement according to this invention which comprises a double outside wheel gearing and which is of such a design that the axle of the motor and its appertaining driving axle are always held in a true parallel position relatively to each other.

The use of outside double wheel gearings arranged according to this invention allows thus of obtaining sufficient room for a powerful motor and great simplicity in the driving mechanism for electric locomotives and cars.

The following further advantages are attained besides those already mentioned: All toothed wheels can be rigidly fixed to axles supported in bearings of ample size and of fair distance; the axle of the motor and the driving axle can be rigidly and securely connected in proximity of the toothed wheels, so that the running of the latter is very smooth; the toothed wheels, the axle-boxes and the bearings of the motor are very easily accessible; all parts are subjected to relatively small strains owing to the arrangement of the bearings near the point at which the force or power acts and to the simultaneous subdivision of the motive-power. The new arrangement of toothed wheel-gearings renders moreover the provision of any flexible couplings or of pulling links and springs between the toothed wheels and the driving axles entirely superfluous so that the design is simplified.

This invention will now be more particularly described with reference to the accompanying drawings, which illustrate constructional examples of the invention. In these drawings:

Figure 1 is a section on the line I—I of Fig. 2 of a portion of the underframe of a locomotive;

Fig. 2 is a corresponding plan-view, showing the main engine frame in section;

Fig. 3 is a section on the line III—III of Fig. 4 and

Fig. 4 a section on the line IV—IV of Fig. 3 through an axle-box shown in these figures on an enlarged scale.

Figs. 5 and 6 are views corresponding to Figs. 1 and 2 respectively, showing a modification of the arrangement illustrated in Figs. 1 and 2.

Fig. 7 is a vertical cross-section of a detail of the arrangement illustrated in Figs. 5 and 6.

Figs. 8 and 9 are plan-views, partly in section, of a portion of the underframes of locomotives, showing further modifications of the arrangement according to this invention.

Referring at first to Figs. 1 and 2, 1 denotes a motor assumed to be entirely symmetrical and provided with two collectors giving plenty of room for the carbon brushes. The axle 18 of this motor carries at both ends equal weights and is subjected to equal strains or stresses. Two toothed pinions 2 and 3 are fixed on the motor axle 18 near its two ends and engage into two spur wheels 4 and 5 respectively, arranged directly on the outside of the two driving wheels 6 and 7 respectively. Each of the two pinions 2, 3 is placed between two bearings 8, 8 and 9, 9 respectively; the motor axle 18 is thus supported in four bearings and has consequently but small bending strains to bear. The pinion casings 10 and 11 with the bearings 8, 8 and 9, 9 respectively, are connected to the outside axle-boxes 12 and 13 respectively by means of rigid pieces 14 and 15. The housing of the motor 1 is supported or suspended in a known manner on the frame of the vehicle by means of the spring 16. The relative vertical motion which takes place between the driving axle 17 and the motor axle 18 on account of the working of their springs causes the axle-boxes 12, 13 to take slightly inclined positions between their vertical guides or axle-jaws 19 and 20. These boxes 12 and 13 must have therefore some little play between the guides 19 and 20 respectively, or they may be provided with sliding blocks 21, 21, as shown in Figs. 3 and 4, which admit a small rocking movement, thus enabling the axle-boxes to assume inclined positions between their guides.

The arrangement illustrated in Figs. 5-7 comprises a motor 1 having only one collector and provided with a double sided gearing of the kind shown in Figs. 1 and 2. These Figs. 5-7 illustrate also another kind of an axle box guide of which Fig. 7 is a vertical section on a somewhat larger scale. This axle box guide comprises pins 22 and 23 securely fixed to the connecting pieces 14 and 15 respectively, and carrying prismatic guide blocks 24 and 25 respectively, adapted to slide vertically in the guides to such an amount as the play of the vehicle springs and of the motor spring 16 will require. It is obvious, that this kind of guide for the driving axle 17 and the motor 1 may be used in connection with any kind of motor. In place of the sliding blocks 24, 25 shown in Figs. 5, 6 and 7, it is sometimes preferred to use guiding links 26 (see Fig. 8) pivoting on a pin 27.

Instead of connecting the casing of the motor 1 and the bearings 8, 8 and 9, 9 to the axle-boxes 12 and 13 respectively of the driving axle 17, the motor axle 18 can also be connected in another manner to the driving axle 17 so as to be kept to a given distance and in a true parallel position relatively to it. Thus, for instance, the casing of the motor 1 may be connected to special bearings 28, 29 mounted on the driving axle 17 and located on the outside of the driving wheels 6, 7 and of the gear wheels 4, 5 and on the inside of the driving axle-boxes 12 and 13 beside the latter (Fig. 9).

In the arrangements shown in Figs. 1 and 5 the axle 18 of the motor is shown on a higher level than the driving axle 17. This is done in order to render the motor more easily accessible from the platform of the vehicle, when it is running.

What I claim now as my invention is:

1. An electrically driven locomotive or car, comprising electric motors, a driving axle in connection with each motor, a pair of driving wheels on each driving axle mounted on opposite sides of the latter, bearings for the driving axles, two groups of toothed wheels in connection with each motor adapted to transmit the tractive power generated by the latter to the appertaining driving axle; and means adapted to rigidly connect each motor to the bearings of the appertaining driving axle in order to keep the latter in a true parallel position relatively to its appertaining motor, said groups of toothed wheels being arranged at opposite sides of the vehicle on the outside of the driving wheels mounted on the same axle.

2. An electrically driven locomotive or car, comprising electric motors, a driving axle in connection with each motor, a pair of driving wheels on each driving axle mounted on opposite sides of the latter, two axle-boxes for each driving axle arranged on the latter on the outside of the driving wheels, two pairs of toothed wheels in connection with each motor adapted to transmit the tractive power generated by the latter to the appertaining driving axle, said two pairs of toothed wheels being arranged at opposite sides of the vehicle on the outside of the driving wheels mounted on the same axle, and a pair of bearings in connection with each motor connecting its casing to the appertaining driving axle and arranged on the latter on the outside of the driving wheels and on the inside of the axle-boxes.

In testimony that I claim the foregoing as my invention I have signed my name.

RUDOLF HOFFMANN.